(12) United States Patent
Chrisofakis et al.

(10) Patent No.: US 9,624,985 B2
(45) Date of Patent: Apr. 18, 2017

(54) COUPLING DEVICE FOR A MOTOR VEHICLE

(71) Applicant: Daimler AG, Stuttgart (DE)

(72) Inventors: Emmanuel Chrisofakis, Waiblingen (DE); Tobias Haerter, Stuttgart (DE); Thomas Kull, Waiblingen (DE); Frank Scheffel, Stuttgart (DE); Joachim Schroeder, Stuttgart (DE); Nils Tonius, Weinstadt (DE)

(73) Assignee: Daimler AG, Stuttgart (DE)

( * ) Notice: Subject to any disclaimer, the term of this patent is extended or adjusted under 35 U.S.C. 154(b) by 0 days.

(21) Appl. No.: 14/900,995

(22) PCT Filed: Jun. 17, 2014

(86) PCT No.: PCT/EP2014/001649
§ 371 (c)(1),
(2) Date: Dec. 22, 2015

(87) PCT Pub. No.: WO2014/202211
PCT Pub. Date: Dec. 24, 2014

(65) Prior Publication Data
US 2016/0160936 A1 Jun. 9, 2016

(30) Foreign Application Priority Data

Jun. 22, 2013 (DE) .......................... 10 2013 010 523
Jul. 11, 2013 (DE) .......................... 10 2013 011 555

(51) Int. Cl.
*F16D 67/02* (2006.01)
*F16D 23/06* (2006.01)
(Continued)

(52) U.S. Cl.
CPC ............. *F16D 23/06* (2013.01); *F16D 25/14* (2013.01); *F16H 3/66* (2013.01); *F16H 61/0265* (2013.01);
(Continued)

(58) Field of Classification Search
CPC ...... F16D 23/06; F16D 25/14; F16H 61/0265; F16H 3/66; F16H 2200/2094;
(Continued)

(56) References Cited

U.S. PATENT DOCUMENTS 1,036,560 A  8/1912  Campbell
1,597,198 A * 8/1926  Howell .................. F16D 11/10
                                                              192/108
(Continued)

FOREIGN PATENT DOCUMENTS

AT           191204 B      8/1957
DE           639397 C     12/1936
(Continued)

OTHER PUBLICATIONS

PCT/EP2014/001649, International Search Report (PCT/ISA/220 and PCT/ISA/210) dated Sep. 1, 2014, with partial English translation, enclosing Written Opinion of the International Searching Authority (PCT/ISA/237) (Thirteen (13) pages).
(Continued)

*Primary Examiner* — David J Hlavka
(74) *Attorney, Agent, or Firm* — Crowell & Moring LLP (57) ABSTRACT

A coupling device for a motor vehicle is disclosed. The coupling device has a friction-locking unit and a form-locking unit which is connected in parallel with the friction-locking unit and has at least two form-locking elements which can be connected to one another by form-locking, are disposed so as to be movable along a direction of actuation relative to one another, and in each case have at least one
(Continued)

claw, where at least some of the claws in each case have a top surface which is oriented obliquely with respect to the direction of actuation.

11 Claims, 3 Drawing Sheets

(51) Int. Cl.
 *F16H 3/66* (2006.01)
 *F16D 48/02* (2006.01)
 *F16H 61/02* (2006.01)
(52) U.S. Cl.
 CPC ............... *F16H 2200/0065* (2013.01); *F16H 2200/2012* (2013.01); *F16H 2200/2046* (2013.01); *F16H 2200/2064* (2013.01); *F16H 2200/2094* (2013.01)
(58) Field of Classification Search
 CPC ..... F16H 2200/2012; F16H 2200/2064; F16H 2200/2046; F16H 2200/0065
 See application file for complete search history.

(56) References Cited

U.S. PATENT DOCUMENTS

| | | | |
|---|---|---|---|
| 2,049,127 A | 7/1936 | Maybach | |
| 3,224,535 A * | 12/1965 | Herbkersman | B23G 7/00 |
| | | | 192/108 |
| 4,114,746 A * | 9/1978 | Usui | F16D 43/06 |
| | | | 192/104 R |
| 7,108,115 B2 * | 9/2006 | Ebenhoch | F16D 23/06 |
| | | | 192/53.1 |
| 7,445,575 B2 * | 11/2008 | Capito | F16D 11/04 |
| | | | 475/204 |
| 7,896,147 B2 * | 3/2011 | Burke | F16D 27/118 |
| | | | 192/69.8 |
| 8,834,217 B2 * | 9/2014 | Yoshimura | B63H 20/20 |
| | | | 192/108 |
| 2015/0133252 A1 * | 5/2015 | Mihatsch | F16H 61/061 |
| | | | 475/86 |

FOREIGN PATENT DOCUMENTS

| | | |
|---|---|---|
| DE | 680423 C | 8/1939 |
| DE | 700712 C | 12/1940 |
| DE | 1 215 450 B | 4/1966 |
| DE | 25 38 781 A1 | 3/1977 |
| DE | 30 35 045 A1 | 3/1982 |
| DE | 196 26 194 A1 | 1/1998 |
| DE | 197 00 769 A1 | 5/1998 |
| DE | 197 11 971 A1 | 9/1998 |
| DE | 10 2007 036 097 A1 | 2/2009 |
| DE | 10 2011 108 024 A1 | 3/2012 |
| EP | 0 184 077 B1 | 6/1986 |
| EP | 2 505 866 A2 | 10/2012 |
| GB | 534727 A | 3/1941 |
| WO | WO 2006/110945 A1 | 10/2006 |

OTHER PUBLICATIONS

German Search Report issued in counterpart DE 10 2013 011 555.8 dated Feb. 10, 2014, with Statement of Relevancy (Six (6) pages).

* cited by examiner

COUPLING DEVICE FOR A MOTOR VEHICLE

BACKGROUND AND SUMMARY OF THE INVENTION

The invention relates to a coupling device.

Coupling devices are already known from DE 30 35 045 A1, EP 2 505 866 A2, DE 25 38 781 A1, with a friction-locking unit and a form-locking unit which is connected in parallel with the friction-locking unit and has two form-locking elements which can be connected to one another by form-locking, are disposed so as to be movable along a direction of actuation relative to one another and in each case have at least one claw. These publications also show claws of form-locking units which in each case have at least partially a top surface which is oriented obliquely with respect to the direction of actuation.

A coupling device for a motor vehicle is already known from the generic DE 10 2011 108 024 A1, with a friction-locking unit and a form-locking unit which is connected in parallel with the friction-locking unit and has two form-locking elements which can be connected to one another by form-locking, are disposed so as to be movable along a direction of actuation relative to one another and in each case have at least one claw. In this case two actuating units which are independent of one another and are provided for actuation of the friction-locking unit and the form-locking unit.

The object of the invention is in particular to increase the convenience of the coupling device.

The starting point for the invention is a coupling device for a motor vehicle with a friction-locking unit and a form-locking unit which is connected in parallel with the friction-locking unit and has two form-locking elements which can be connected to one another by form-locking, are disposed so as to be movable along a direction of actuation relative to one another and in each case have at least one claw.

It is proposed that the claws in each case have at least partially a top surface which is oriented obliquely with respect to the direction of actuation. As a result a particularly advantageously chamfered claw geometry can be provided, by which in a tooth-on-tooth position the form-locking elements can advantageously be guided by the top surfaces oriented obliquely with respect to the direction of actuation, so that the tooth-on-tooth position can be released in a controlled manner by an actuating force acting in the direction of actuation. In the tooth-on-tooth position a minimum overlap of the claws can already be achieved by the top surfaces oriented obliquely with respect to the direction of actuation, so that ratcheting can be prevented. Furthermore the tooth-on-tooth position can be continuously released by the top surfaces oriented obliquely with respect to the direction of actuation, so that a sudden release of the tooth-on-tooth position associated with a shock load can be prevented. Due to the obliquely oriented top surfaces of the claws, the actuating force by which one of the form-locking elements is engaged in the other form-locking element can be advantageously redirected and used for releasing the tooth-on-tooth position. Due to the redirected actuating force overpressure can be applied to the friction-locking unit, so that the form-locking elements can be rotated relative to one another by means of the actuating force. As a result the tooth-on-tooth position can be released reliably and comfortably, so that the convenience of the coupling device can be increased. A "coupling device" should be understood in particular to be both a clutch device and also a brake device. A "clutch device" should be understood in particular to be a device which is provided in order for two rotatably disposed coupling device elements to be selectively connected to one another non-rotatably or separated from one another. A "brake device" should be understood in particular to be a device which is provided in order for a rotatable coupling element and a stationary coupling, which is preferably connected non-rotatably to a stationary component or is formed integrally therewith, to be connected to one another non-rotatably or to be separated from one another as required. The stationary component is advantageously configured as a housing and particularly advantageously as a transmission housing. A "friction-locking unit" should be understood in particular to be a unit which produces the non-rotatable connection substantially by a frictional grip, such as for example a multiple-disc clutch or a multiple-disc brake. A "form-locking unit" should be understood in particular to be a unit which produces the non-rotatable connection substantially by form locking, such as for example a claw clutch or a claw brake. The friction-locking unit and the form-locking unit are preferably functionally disposed between the two coupling elements. The direction of actuation is advantageously parallel to an axis of rotation of the two form-locking elements. A "top surface" should in particular be understood to be a surface of a claw which faces the corresponding form-locking element. The top surface is preferably formed between two flanks of the claw. In the tooth-on-tooth position the top surfaces of the claws of the first form-locking element and the top surfaces of the claws of the second form-locking element preferably contact one another. The top surface has at least one surface normal with an axially directed directional component greater than zero. The expression "axial" relates in particular to the direction of actuation or the axis of rotation, so that the term "axial" designates a direction which extends in the direction of actuation or on the axis of rotation or parallel to the direction of actuation or the axis of rotation. "Obliquely with respect to the direction of actuation" should in particular be understood to mean that the top surface has at least one surface normal which is oriented obliquely with respect to the direction of actuation. "Provided" should be understood in particular to mean specially designed, equipped and/or disposed.

In order to save costs, it is further proposed that the top surfaces in each case are at least substantially planar, so that the top surfaces oriented obliquely with respect to the direction of actuation can be produced simply. A "planar top surface" should in particular be understood to mean a top surface which has no curvature. In this context "substantially planar" should in particular be understood to mean that at least 60%, advantageously at least 80% and particularly advantageously at least 90% of the top surface is planar.

Furthermore it is proposed that the top surfaces in each case have at least one surface normal with a directional component greater than zero directed in the circumferential direction. As a result the top surface can be directed in the circumferential direction, so that in the tooth-on-tooth position a circumferential force can be provided which can be used for releasing the tooth-on-tooth position and by which overpressure can be applied to the friction-locking unit for rotation of one of the form-locking elements. The expression "circumferential direction" relates in particular to the direction of actuation or the main axis of rotation, so that the term "circumferential direction" designates a direction which extends around the direction of actuation or around the axis of rotation. The circumferential direction preferably lies in a plane which is oriented perpendicular to the direction of actuation or to the axis of rotation.

In particular it is advantageous if the top surfaces in each case have at least one surface normal with a radially directed directional component equal to zero, so that the production of the top surfaces can be further simplified. The term "radially" relates in particular to the direction of actuation or the axis of rotation, so that the expression "radially" designates a direction which extends perpendicular to the direction of actuation or to the axis of rotation.

Furthermore, it is advantageous if the claws in each case have a coupling flank which in each case enclose an obtuse angle with a plane defined by the associated top surface. In this way the coupling flanks can be particularly large, so that the form-locking elements can be connected to one another particularly reliably by form-locking. A "coupling flank" should in particular be understood to be a flank of the claw which is provided for contacting a corresponding claw for torque transmission. The coupling flank is preferably formed by a surface of the claw, the surface normal of which advantageously points away from the claw. A "plane defined by the top surface" should in particular be understood to be a plane in which the top surface is disposed. In this context an "associated top surface" should in particular be understood to be a top surface which is formed by the claw which also forms the coupling flank with which the plane defined by the top surface encloses the obtuse angle.

Furthermore, it is advantageous if the claws in each case have opposite the coupling flank a flank which in each case encloses an acute angle with a plane defined by the associated top surface, so that the claws can particularly advantageously be chamfered on one side. The flank is preferably formed by a surface of the claw, the surface normals of which advantageously point away from the claw.

In an advantageous embodiment the coupling flanks each enclose a right angle with a plane which is disposed on the associated claw base and is oriented perpendicular to the direction of actuation, so that a high torque can be transmitted. A "plane defined by the top surface" should in particular be understood to be a plane in which an attachment surface is disposed by which the claw is fastened preferably on a main body. In this context an "associated claw base" should in particular be understood to be a claw base which is formed by the claw which also forms the coupling flank with which the plane disposed on the claw base encloses the right angle.

In a further embodiment according to the invention the top surfaces extend in each case as far as the claw base, so that impact forces upon release of the tooth-on-tooth position can be reduced or even prevented.

It is particularly advantageous if the claws are in each case disposed on the end face, so that a particularly advantageous coupling device can be provided.

Furthermore, it is proposed that the friction-locking unit has at least one friction-locking element which is permanently connected non-rotatably to one of the form-locking elements. As a result the form-locking element which is permanently connected non-rotatably to the friction-locking element can rotate relative to the engaging form-locking element due to the application of overpressure to the friction-locking unit, so that the tooth-on-tooth position can be released particularly simply. "Non-rotatably connected" should in particular be understood to be a connection in which a power flow averaged over a complete revolution is transmitted with an unchanged torque, an unchanged direction of rotation and/or an unchanged rotational speed.

Further advantages can be seen from the following description of the drawings. Three exemplary embodiments of the invention are shown in the drawings. The drawings, the description of the drawings and the claims contain numerous features in combination. Expediently, the person skilled in the art will also consider the features singly and combine them to form meaningful further combinations.

DETAILED DESCRIPTION OF THE DRAWINGS

Figure 1:
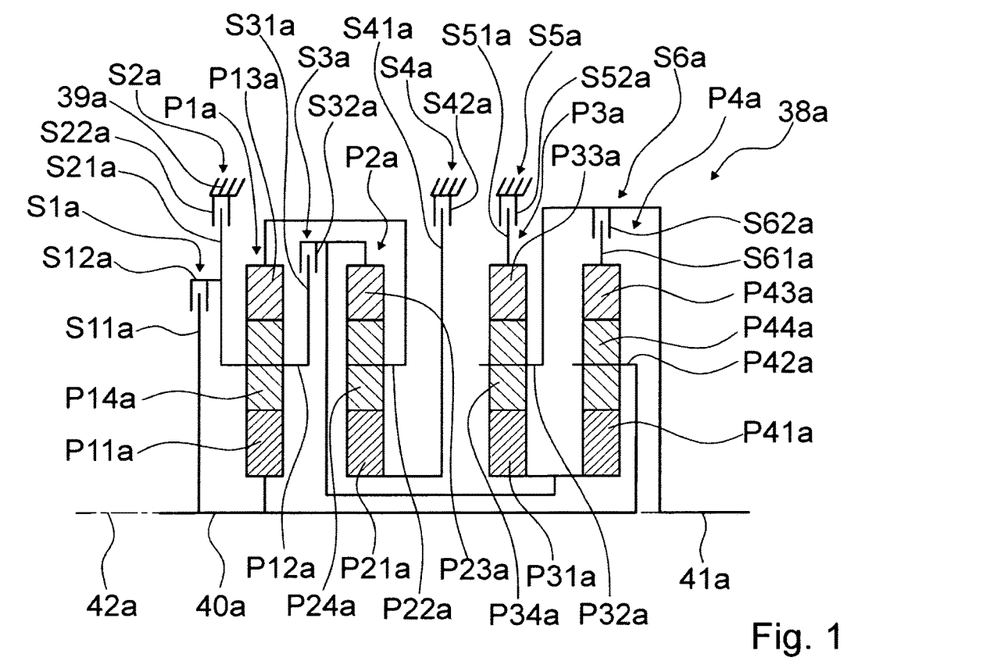
FIG. 1 shows a transmission diagram of a multi-stage transmission which has a coupling device with a friction-locking unit and a form-locking unit connected in parallel with the friction-locking unit.

FIG. 1 shows a multi-stage transmission of a motor vehicle. The motor vehicle has an internal combustion engine which is not illustrated in greater detail for driving the motor vehicle and drive gears which are not illustrated in greater detail. In this case the multi-stage transmission is disposed in a flux of force between the internal combustion engine and the drive gears. The multi-stage transmission connects the internal combustion engine to the drive gears. By means of the multi-stage transmission a transmission ratio is set between the internal combustion engine and the drive gears. The multi-stage transmission can be connected to a hybrid drive module by means of which a driving torque can be changed. Furthermore a CVT can be produced by means of the hybrid drive module and the multi-stage transmission, so that the transmission ratio can be continuously adjusted at least in part-ranges.

The multi-stage transmission has a gear wheel set 38*a* for setting of ten gears. The gear wheel set 38*a* has nine forward gears and one reverse gear. The forward transmission gears have successive transmission ratios. In this case the first forward gear has the maximum transmission ratio and the last, in this exemplary embodiment the ninth forward gear, has the smallest transmission ratio, the transmission ratios decreasing from the low to the high forward gears. The reverse gear has a reverse direction of rotation by comparison with the forward gears.

The multi-stage transmission also has a transmission housing 39*a* which is disposed stationary. The gear wheel set 38*a* is disposed inside the transmission housing 39*a*.

For introduction into the gear wheel set 38*a* of a driving torque produced by the internal combustion engine the multi-stage transmission has a transmission input shaft 40*a*. The transmission input shaft 40*a* is disposed in a flux of force proceeding from the internal combustion engine after the internal combustion engine and before the gear wheel set 38*a*. It is provided for non-rotatable connection of the internal combustion engine and thus for non-rotatable connection of a crankshaft of the internal combustion engine to the gear wheel set 38*a*. The transmission input shaft 40*a* connects the internal combustion engine in drive terms to the gear wheel set 38a. A module which is not illustrated in greater detail and in particular provides a starting functionality can be connected upstream of the transmission input shaft 40a. A torque converter or a wet starting clutch for example is conceivable as a module connected upstream. Basically, however, the module provided for starting may also be integrated into the gear wheel set 38a.

The multi-stage transmission has a transmission output shaft 41a for output of a transmitted driving torque. The transmission output shaft 41a is disposed in the flux of force proceeding from the internal combustion engine after the gear wheel set 38a and before the drive gears. The transmission output shaft 41a connects the gear wheel set 38a in drive terms to the drive gears of the motor vehicle. A module (not illustrated in greater detail) can be connected downstream of the transmission output shaft 41a, and by means of this module the driving torque output from the gear wheel set 38a can be distributed to the drive gears, such as for example a planetary gear system, which is provided for speed compensation between the drive wheels, or an all-wheel drive unit which distributes the driving torque to two different drive axles. The transmission input shaft 40a and the transmission output shaft 41a can in principle be disposed in any way relative to one another.

The gear wheel set 38a has four planetary gear stages P1a, P2a, P3a, P4a which are functionally connected to one another for shifting the gears. The first planetary gear stage P1a, the second planetary gear stage P2a, the third planetary gear stage P3a and the fourth planetary gear stage P4a are disposed one behind the other along a main axis of rotation 42a. An axis of rotation of the transmission input shaft 40a coincides with the main axis of rotation 42a. All the planetary gear stages P1a, P2a, P3a, P4a of the gear wheel set 38a have a single planetary gear set. The designations "first", "second", "third" and "fourth" identify an axial succession of the planetary gear stages P1a, P2a, P3a, P4a starting from the internal combustion engine. Accordingly the first planetary gear stage P1a by comparison with the other planetary gear stages P2a, P3a, P4a is disposed at the first axial position, the second planetary gear stage P2a by comparison with the other planetary gear stages P1a, P3a, P4a is disposed at the second axial position, the third planetary gear stage P3a by comparison with the other planetary gear stages P1a, P2a, P4a is disposed at the third axial position and the fourth planetary gear stage P4a by comparison with the other planetary gear stages P1a, P2a, P3a is disposed at the fourth axial position.

The four planetary gear stage P1a, P2a, P3a, P4a are described in greater detail below. The four planetary gear stages P1a, P2a, P3a, P4a each have a sun gear, a planetary gear support and a ring gear. In this case for the sake of simplicity a "first to fourth planetary gear support", a "first to fourth sun gear" and a "first to fourth ring gear" should be understood to mean respectively a planetary gear support or a sun gear or a ring gear associated with the first to fourth planetary gear stage, i.e. for example that the first planetary gear support should be understood to be a planetary gear support of the first planetary gear stage.

The first planetary gear stage P1a is disposed on the input side. The first planetary gear stage P1a comprises a first sun gear P1a, a first ring gear P13a and a first planetary gear support P12a. The first planetary gear support P12a carries planetary gears P14a of the first planetary gear stage P1a on a circular path. The planetary gears P14a mesh with the first sun gear P11a and with the first ring gear P13a. The planetary gears P14a are rotatably mounted on the first planetary gear support P12a.

The second planetary gear stage P2a is disposed centrally on the input side.

The second planetary gear stage P2a comprises a second sun gear P21a, a second ring gear P23a and a second planetary gear support P22a. The second planetary gear support P22a carries planetary gears P24a of the second planetary gear stage P2a on a circular path. The planetary gears P24a mesh with the second sun gear P21a and with the second ring gear P23a. The planetary gears P24a are rotatably mounted on the second planetary gear support P22a.

The third planetary gear stage P3a is disposed centrally on the output side. The third planetary gear stage P3a comprises a third sun gear P31a, a third ring gear P33a and a third planetary gear support P32a. The third planetary gear support P32a carries planetary gears P34a of the third planetary gear stage P3a on a circular path. The planetary gears P34a mesh with the third sun gear P31a and with the third ring gear P33a. The planetary gears P34a are rotatably mounted on the third planetary gear support P32a.

The fourth planetary gear stage P4a is disposed on the output side. The planetary gear stage P4 comprises a fourth sun gear P41a, a fourth ring gear P43a and a fourth planetary gear support P42a. The fourth planetary gear support P42a carries planetary gears P44a of the fourth planetary gear stage P4a on a circular path. The planetary gears P44a mesh with the fourth sun gear P41a and with the fourth ring gear P43a. The planetary gears P44a are rotatably mounted on the fourth planetary gear support P42a.

The first ring gear P13a is permanently connected non-rotatably to the second planetary gear support P22a. The second ring gear P23a is permanently connected non-rotatably to the third sun gear P31a and is permanently connected non-rotatably to the fourth sun gear P41a. The third sun gear P31a and the fourth sun gear P41a are permanently connected non-rotatably to one another. For introduction of the driving torque provided by the internal combustion engine the first planetary gear stage P1a and the fourth planetary gear stage P4a are in each case configured as an input stage. For configuration of the first planetary gear stage P1a as an input stage the first sun gear P11a is permanently connected non-rotatably to the transmission input shaft 40a. For configuration of the fourth planetary gear stage P4a as an input stage the fourth planetary gear support P42a is permanently connected non-rotatably to the transmission input shaft 40a. For output of the driving torque transmitted by the gear wheel set 38a the third planetary gear stage P3a and the fourth planetary gear stage P4a are in each case configured as an output stage. For configuration of the third planetary gear stage P3a as an output stage the third planetary gear support P32a is permanently connected non-rotatably to the transmission output shaft 41a. For configuration of the fourth planetary gear stage P4a as an output stage the fourth ring gear P43a can be connected non-rotatably to the transmission output shaft 41a.

For shifting the gears the gear wheel set has six coupling devices S1a, S2a, S3a, S4a, S5a, S6a. The coupling devices S1a, S2a, S3a, S4a, S5a, S6a are each configured as a shifting device provided for shifting the gears. The coupling devices S1a, S2a, S3a, S4a, S5a, S6a are provided in order either to selectively connect two rotatable transmission elements to one another non-rotatably and to separate them from one another, or to selectively connect a rotatable transmission element non-rotatably to the transmission housing 39a or to separate said transmission element from said transmission housing. In this case a transmission element is a sun gear P11a, P21a, P31a, P41a, a planetary gear support P12a, P22a, P32a, P42a or a ring gear P13a, P23a, P33a, P43a.

The coupling devices S1a, S2a, S3a, S4a, S5a, S6a transmit different torques in the gears. For the coupling devices S1a, S2a, S3a, S4a, S5a, S6a the gear wheel set 38a defines torque factors in the gears. Torques transmitted in the gears by the coupling devices S1a, S2a, S3a, S4a, S5a, S6a are defined in the gear wheel set 38a by the torque factors. The torque factors are dependent upon a position of the coupling devices S1a, S2a, S3a, S4a, S5a, S6a in the gear wheel set 38a. The torques which are transmitted by the coupling devices S1a, S2a, S3a, S4a, S5a, S6a are dependent upon a shifted gear, the torque factor and a driving torque. The six coupling devices S1a, S2a, S3a, S4a, S5a, S6a each have a total design torque. The respective total design torques conform to a maximum torque to be transmitted by the respective coupling device S1a, S2a, S3a, S4a, S5a, S6a in the associated gears. The total design torques are adapted to the gears and can differ from coupling device S1a, S2a, S3a, S4a, S5a, S6a to coupling device S1a, S2a, S3a, S4a, S5a, S6a.

The three coupling devices S1a, S3a, S6a are in each case configured as a clutch. They each have a first rotatable coupling element S11a, S31a, S61a and a second rotatable coupling element S12a, S32a, S62a. The three coupling devices S1a, S3a, S6a are in each case provided in order to connect the two rotatable coupling elements S11a, S12a, S31a, S32a, S61a, S62a thereof to one another non-rotatably.

The three coupling units S2a, S4a, S5a are in each case configured as a brake. They each have a rotatable coupling element S21a, S41a, S51a and a fixed coupling element S22a, S42a, S52a fixed to the housing. The coupling devices S2a, S4a, S5a are in each case provided in order to connect the rotatable coupling element S21a, S41a, S51a thereof and the fixed coupling element S22a, S42a, S52a thereof to one another non-rotatably. They are in each case provided in order to connect the rotatable coupling element S21a, S41a, S51a fixedly to the housing and thus to connect said coupling element non-rotatably to the transmission housing 39a.

The first coupling device S1a has the first rotatable coupling element S11a and the second rotatable coupling element S12a. The first rotatable coupling element S11a of the first coupling device S1a is permanently connected non-rotatably to the transmission input shaft 40a. The second rotatable coupling element S12a of the first coupling device S1a is permanently connected non-rotatably to the rotatable coupling element S21a of the second coupling device S2a. The second rotatable coupling element S12a of the first coupling device S1a is also permanently connected non-rotatably to the first planetary gear support P12a. The first coupling device S1a is provided in order to connect the first planetary gear support P12a non-rotatably to the transmission input shaft 40a.

The second coupling device S2a has the rotatable coupling element S21a and the fixed coupling element S22a. The rotatable coupling element S21a of the second coupling device S2a is permanently connected non-rotatably to the first planetary gear support P12a. Furthermore the rotatable coupling element S21a of the second coupling device S2a is permanently connected non-rotatably to the first rotatable coupling element S31a of the third coupling device S3a. The fixed coupling element S22a of the second coupling device S2a is permanently connected non-rotatably to the transmission housing 39a. The fixed coupling element S22a of the second coupling unit S2a is configured integrally with the transmission housing 39a. The second coupling device S2a is provided in order to connect the first planetary gear support P12a fixedly to the housing.

The third coupling device S3a has the first rotatable coupling element S31a and the second rotatable coupling element S32a. The first rotatable coupling element S31a of the third coupling device S3a is permanently connected non-rotatably to the first planetary gear support P12a. The second rotatable coupling element S32a of the third coupling device S3a is permanently connected non-rotatably to the second ring gear P23a. The second rotatable coupling element S32a of the third coupling device S3a is also permanently connected non-rotatably to the third ring gear P31a and permanently connected non-rotatably to the fourth sun gear P41a. The third coupling device S3a is provided in order to connect the first planetary gear support P12a, the second ring gear P23a, the third sun gear P31a and the fourth sun gear P41a to one another non-rotatably.

The fourth coupling device S4a has the rotatable coupling element S41a and the fixed coupling element S42a. The rotatable coupling element S41a of the fourth coupling device S4a is permanently connected non-rotatably to the second sun gear P21a. The fixed coupling element S42a of the fourth coupling device S4a is permanently connected non-rotatably to the transmission housing 39a. The fourth coupling device S4a is provided in order to connect the second sun gear P21a fixedly to the housing.

The fifth coupling device S5a has the rotatable coupling element S51a and the fixed coupling element S52a. The rotatable coupling element S51a of the fifth coupling device S5a is permanently connected non-rotatably to the third ring gear P33a. The fixed coupling element S52a of the fifth coupling device S5a is permanently connected non-rotatably to the transmission housing 39a. The fifth coupling device S5a is provided in order to connect the third ring gear P33a fixedly to the housing.

The sixth coupling device S6a has the first rotatable coupling element S61a and the second rotatable coupling element S62a. The first rotatable coupling element S61a of the sixth coupling device S6a is permanently connected non-rotatably to the fourth ring gear P43a. The second rotatable coupling element S62a of the sixth coupling device S6a is permanently connected non-rotatably to the third planetary gear support P32a. The second rotatable coupling element S62a of the sixth coupling device S6a is also permanently connected non-rotatably to the transmission output shaft 41a. The sixth coupling device S6a is provided in order to connect the fourth ring gear P43a, the third planetary gear support P32a and the transmission output shaft 41a non-rotatably to one another.

The first, third, fourth, fifth and sixth coupling device S1a, S3a, S4a, S5a, S6a have, for non-rotatable connection of their coupling elements S1a, S12a, S31a, S32a, S41a, S42a, S51a, S52a, S61a, S62a, only one friction-locking unit in each case. The friction-locking units in each case comprise a disc set.

Figure 2:
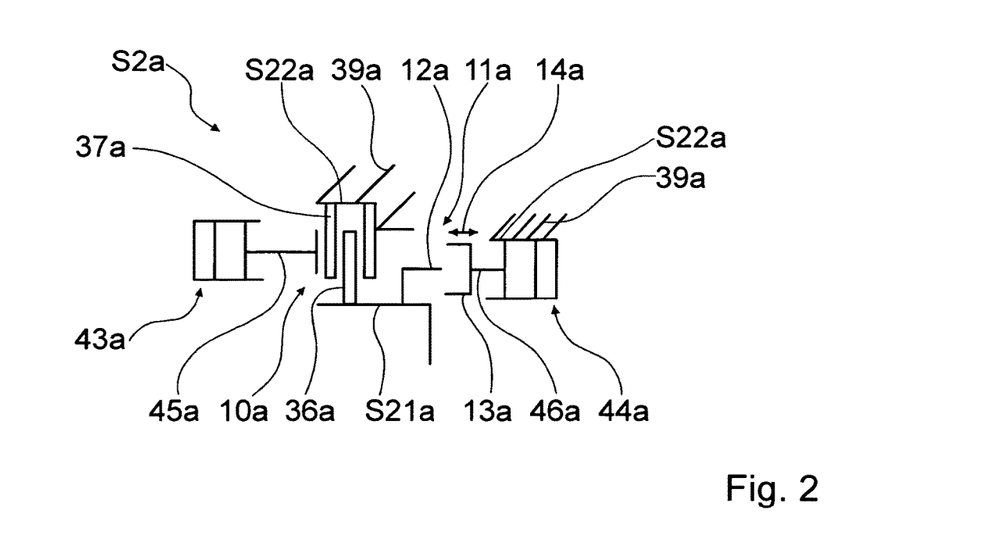
FIG. 2 shows the coupling device in a schematic representation.
Figure 3:
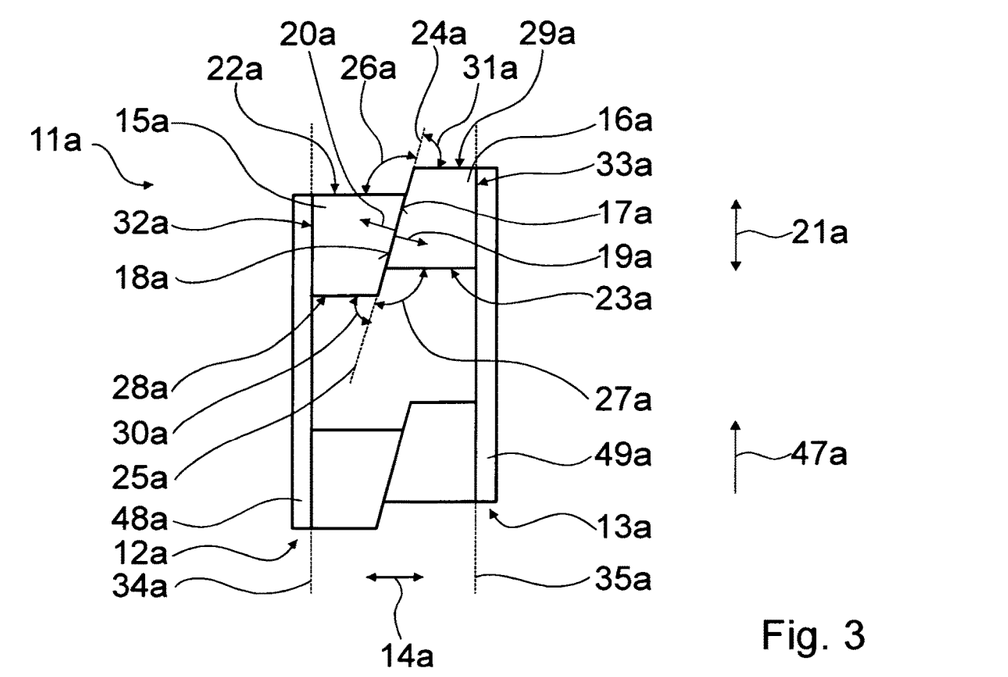
FIG. 3 shows the form-locking unit schematically in a tooth-on-tooth position.
Figure 4:
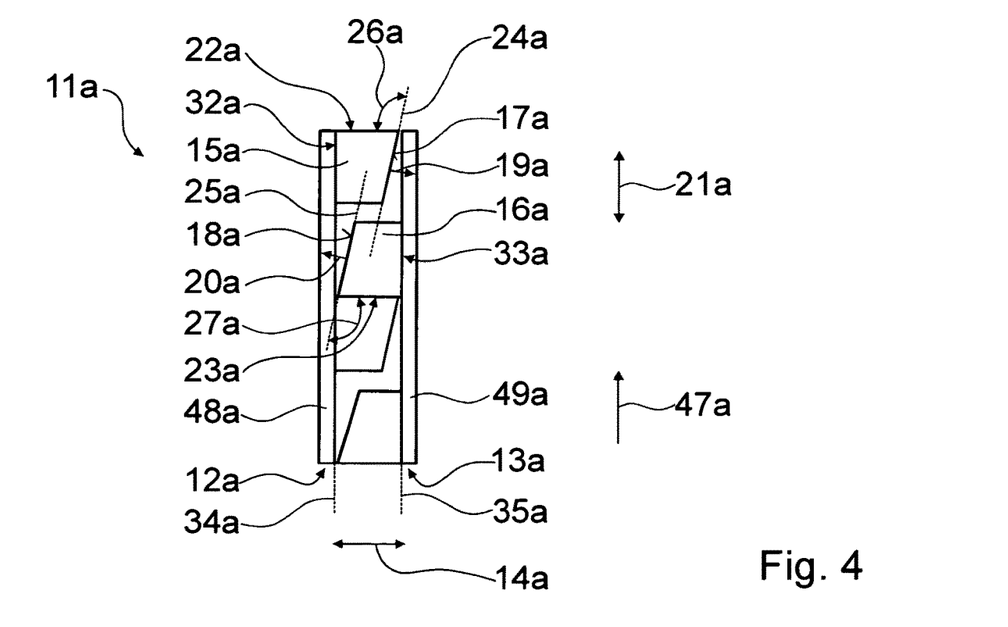
FIG. 4 shows the form-locking unit schematically in a closed state.

The second coupling device S2a is in combined form (cf. FIG. 2). The second coupling device S2a has a friction-locking unit 10a and a form-locking unit 11a connected in the flux of force in parallel with the friction-locking unit 10a. The friction-locking unit 10a and the parallel connected form-locking unit 11a are in each case provided in order to connect the rotatable coupling element S21a of the second coupling device S2a fixedly to the housing and thus to connect said coupling element non-rotatably to the transmission housing 39a. The second coupling device S2a is configured as a combined coupling device. It is associated with the first planetary gear stage P1a. The first planetary gear stage P1a is configured as a planetary gear stage associated with the combined coupling device S2a. The friction-locking unit 10a and the form-locking unit 11a of the second coupling device S2a are in each case functionally disposed between the rotatable coupling element S21a and the transmission housing 39a. The form-locking unit 11a is shown schematically in FIGS. 3 and 4, wherein in FIG. 3 a tooth-on-tooth position is shown and in FIG. 4 a closed state is shown in which the form-locking elements 12a, 13a are completely engaged in one another. The form-locking unit 11a is illustrated in FIGS. 3 and 4 in a radially oriented viewing direction.

The friction-locking unit 10a of the second coupling device S2a transmits the applied torque to the first planetary gear support P12a in the shifted eighth forward gear and in the shifted ninth forward gear. The form-locking unit 11a of the second coupling device S2a transmits the applied torque to the first planetary gear support P12a only in the shifted reverse gear. Alternatively or in addition the form-locking unit can also transmit the applied torque in the eighth and ninth forward gear if the holding pressure on the friction-locking unit is lowered. The friction-locking unit 10a and the form-locking unit 11a of the second coupling device S2a each have a design torque. The design torque of the friction-locking unit 10a and the design torque of the form-locking element 11a are different. The design torque of the friction-locking unit 10a is lower than the total design torque of the second coupling device S2a. The design torque of the form-locking unit 11a corresponds to the total design torque of the second coupling device S2a. Thus the design torque of the friction-locking unit 10a is lower than the design torque of the form-locking element 11a.

In the shifted reverse gear the second coupling device S2a transmits a torque which is higher than the design torque of the friction-locking unit 10a and in the shifted eighth and ninth forward gear said second coupling device transmits a torque which is lower than the design torque of the friction-locking unit 10a. In this case in the eighth and ninth forward gear, in which the applied torque is lower than the design torque of the friction-locking unit 10a, the friction-locking unit 10a transmits the applied torque completely. In this exemplary embodiment, in the reverse gear, in which the applied torque is higher than the design torque of the friction-locking unit 10a, the form-locking unit 11a likewise transmits the applied torque completely. The friction-locking unit 10a supports a pushing torque and the form-locking unit 11a supports a pulling torque. In principle it is also conceivable that in at least one of the gears in which the applied torque is higher than the design torque of the friction-locking unit 10a, the form-locking unit 11a only transmits a surplus torque. In this case the surplus torque is approximately a difference between the applied torque and the design torque of the friction-locking unit 10a.

The friction-locking unit 10a of the second coupling device S2a is configured as a multiple-disc brake. The friction-locking unit 10a comprises a disc set for non-rotatable connection of the coupling elements S21a, S22a. Furthermore, the friction-locking unit 10a of the second coupling device S2a has an outer disc support which is permanently connected non-rotatably to the transmission housing 39a, and an inner disc support which is permanently connected non-rotatably to the rotatable coupling element S21a. The inner disc support of the second coupling device S2a is permanently connected non-rotatably to the planetary gear support P12a of the first planetary gear stage P1a. The friction-locking unit 10a comprises first friction-locking elements 36a and second friction-locking elements 37a. The first friction-locking elements 36a are permanently connected non-rotatably to the rotatable coupling element S21a of the second coupling device S2a. The first friction-locking elements 36a are configured as inner discs. The second friction-locking elements 37a are permanently connected non-rotatably to the fixed coupling element S22a. Thus they are permanently connected non-rotatably to the transmission housing 39a. The second friction-locking elements 37a are disposed so as to be axially movable relative to the fixed coupling element S22a. In principle the friction-locking unit 10a can have only one single first friction-locking element 36a and/or only one single second friction-locking element 37a.

The friction-locking unit 10a of the second coupling device S2a is configured as a claw brake. The form-locking unit 11a comprises a first form-locking element 12a and a second form-locking element 13a which can be connected to one another by form-locking. The first form-locking element 12a is permanently connected non-rotatably to the rotatable coupling element S21 of the combined coupling element S2a. It is permanently connected non-rotatably to the inner disc support of the second coupling device S2a. The first friction-locking element 36a of the friction-locking unit 10a and the first form-locking element 12a of the form-locking unit 11a are permanently connected non-rotatably to one another. The first form-locking element 12a is configured as a form-locking element permanently connected to the first friction-locking elements 36a. The first form-locking element 12a is configured integrally with the rotatable coupling element S21a. The second form-locking element 13a is permanently connected non-rotatably to the fixed coupling element S22a. Thus it is permanently connected non-rotatably to the transmission housing 39a. In an engagement operation the second form-locking element 13a is configured as an engaging form-locking element which is displaced axially for closure of the form-locking unit 11a.

The first form-locking element 12a and the second form-locking element 13a each have a claw toothing, said claw toothings being configured to correspond to one another. The form-locking elements 12a, 13a in each case have a main body 48a, 49a to accommodate the claw toothings. The claw toothing of the first form-locking element 12a is fixed on the main body 48a. The main body 48a is fixedly connected to the rotatable coupling element S21a. The claw toothing of the second form-locking element 13a is fixed on the main body 49a. The claw toothings are in each case configured as an end toothing. They are in each case disposed on an end face of the corresponding main body 48a, 49a. The end faces of the main bodies 48a, 49a on which the claw toothings are disposed face one another. They are axially directed.

The form-locking elements 12a, 13a are disposed so as to be movable relative to one another along an axial direction of actuation 14a. The second form-locking element 13a is disposed so as to be axially movable along the direction of actuation 14a relative to the first form-locking element 12a and relative to the transmission housing 39a. The second form-locking element 13a is permanently connected non-rotatably, but axially movably, to the fixed coupling element S22a and thus to the transmission housing 39a. The direction of actuation 14a is oriented parallel to the main axis of rotation 42a.

The claw toothing on the end face of the first form-locking element 12a has a plurality of claws 15a which are offset with respect to one another along a circumferential direction 21a of the first form-locking element 12a. In FIGS. 3 and 4 only one of the claws 15a is provided with a reference numeral. The claw toothing on the end face of the second form-locking element 13a has a plurality of claws 16a which are offset with respect to one another along a circumferential direction 21a of the second form-locking element 13a. In FIGS. 3 and 4 only one of the claws 16a is provided with a reference numeral.

The claws 15a of the first form-locking element 12a are configured analogously to one another, which is why only the claw 15a of the first form-locking element 12a which is provided with the reference numeral is described in greater detail. The claw 15a is chamfered at the top end. The claw 15a has a top surface 17a which faces the second form-locking element 13a and is oriented obliquely with respect to the direction of actuation 14a. The top surface 17a is provided in order to contact a corresponding claw 16a of the second form-locking element 13a in a tooth-on-tooth position. The top surface 17a is planar.

The top surface 17a has surface normals 19a which are oriented obliquely with respect to the direction of actuation 14a. The surface normals 19a each have an axially directed directional component greater than zero, a directional component greater than zero directed in the circumferential direction 21a, and a radially directed directional component equal to zero. Only the axially directed directional component and the directional component directed in the circumferential direction 21a of the surface normals 19a of the top surface 17a are greater than zero. Thus the surface normals 19a in each case have a directional component which is oriented parallel to the circumferential direction 21a and is greater than zero, and a directional component which is oriented parallel to the direction of actuation 14a and is greater than zero. In this case a directional component of the surface normal 19 which is oriented perpendicular to the circumferential direction 21a and perpendicular to the direction of actuation 14a is equal to zero. Thus the top surface 17a is directed axially and in the circumferential direction 21a. The surface normals 19a point in the direction of the second form-locking element 13a. They point in an opening direction in which the second form-locking element 13a must be axially displaced for opening of the form-locking unit 11a.

The claw 15a has a coupling flank 22a which encloses an obtuse angle 26a and thus an angle 26a greater than 90° with a plane 24a defined by the top surface 17a of the claw 15a. The coupling flank 22a is oriented perpendicular to the circumferential direction 21a. The coupling flank 22a is disposed perpendicular to a plane which is oriented perpendicular to the circumferential direction 14a. The coupling flank 22a is oriented perpendicular to a tangential direction of rotation in which the form-locking element 12a rotates during operation. The direction of rotation is directed in the circumferential direction 21a. The coupling flank 22a has surface normals which in each case are oriented parallel to the circumferential direction 21a. The coupling flank 22a of the claw 15a encloses a right angle and thus an angle of 90° with a plane 34a which is disposed on the claw base 32a of the claw 15a and is oriented perpendicular to the direction of actuation 14a. The claw 15a is disposed with its claw base 32a on the main body 48a of the first form-locking element 12a.

In the closed state of the form-locking unit 11a the claw 15a with its coupling flank 22a contacts a corresponding claw 16a of the second form-locking element 13a by form-locking, so that a torque can be transmitted between the two form-locking elements 12a, 13a.

The claw 15a also has opposite the coupling flank 22a a flank 28a which encloses an acute angle 30a and thus an angle 30a less than 90° with a plane 24a defined by the top surface 17a of the claw 15a. The coupling flank 22a and the flank 28a are disposed parallel to one another. The flank 28a opposite the coupling flank 22a is directed in the circumferential direction 21a. The flank 28a opposite the coupling flank 22a encloses a right angle and thus an angle of 90° with the plane 34a which is disposed on the claw base 32a and is oriented perpendicular to the direction of actuation 14a. The coupling flank 22a of the claw 15a and the flank 28a of the claw 15a opposite the coupling flank 22a have different axial extents from one another. The axial extent of the coupling flank 22a of the claw 15a is greater than the axial extent of the flank 28a of the claw 15a opposite the coupling flank 22a.

The flank 28a of the claw 15a opposite the coupling flank 22a is directed in the opposite direction to the coupling flank 22a of the claw 15a. It has surface normals which in each case are oriented parallel to the circumferential direction 21a. The coupling flank 22a and the flank 28a face away from one another. The surface normals of the coupling flank 22a and the surface normals of the flank 28a opposite the coupling flank 22a are directed in opposite directions to one another.

The top surface 17a, the coupling flank 22a and the flank 28a are configured as surfaces of the claw 15a. The top surface 17a is disposed between the coupling flank 22a and the flank 28a. The plane 24a defined by the top surface 17a of the claw 15a and the plane 34a disposed on the claw base 32a of the claw 15a are disposed obliquely relative to one another. They intersect one another in a sectional line.

In a traction mode of the motor vehicle the first form-locking element 12a rotates in a direction of rotation 47a with the second coupling device S2a opened. The coupling flank 22a of the claw 15a of the first form-locking element 12a is directed in the direction of rotation 47a. The surface normals of the coupling flank 22a of the claw 15a point in the direction of rotation 47a. The flank 28a of the claw 15a of the first form-locking element 12a opposite the coupling flank 22a is directed in the opposite direction to the direction of rotation 47a. The surface normals of the flank 28a of the claw 15a opposite the coupling flank 22a point in the opposite direction to the direction of rotation 47a.

The claws 16a of the second form-locking element 13a are configured analogously to the claw 15a of the first form-locking element 12a, which is why only the claw 16a of the second form-locking element 13a which is provided with the reference numeral is only described briefly. The claw 16a has a top surface 18a which faces the first form-locking element 12a and is oriented obliquely with respect to the direction of actuation 14a. The top surface 18a is provided in order to contact one of the corresponding claws 15a of the first form-locking element 12a in a tooth-on-tooth position. In the tooth-on-tooth position the top surfaces 17a of the claws 15a of the first form-locking element 12a and the top surfaces 18a of the claws 16a of the second form-locking element 13a contact one another.

The top surface 18a is planar. The top surface 18a has surface normals 20a which each have an axially directed directional component greater than zero, a directional component greater than zero directed in the circumferential direction 21a, and a radially directed directional component equal to zero. The top surface 17a of the claw 15a of the first form-locking element 12a and the top surface 18a of the claw 16a of the second form-locking element 13a face one another. The surface normals 20a point in the direction of the first form-locking element 12a. The surface normals 19a of the top surface 17a and the surface normals 20a of the top surface 18a are oriented in opposite directions to one another. The surface normals 20a of the top surface 18a point in the direction of the first form-locking element 12a. They point in a closing direction in which the second form-locking element 13a must be axially displaced for closing the form-locking unit 11a.

The claw 16a has a coupling flank 23a which encloses an obtuse angle 27a with a plane 25a defined by the top surface 18a of the claw 16a. In the closed state of the form-locking unit 11a the coupling flanks 22a of the claws 15a of the first form-locking element 12a and the coupling flanks 23a of the claws 16a of the second form-locking element 13a contact one another. The coupling flank 23a of the claw 16a encloses a right angle with a plane 35a which is disposed on the claw base 33a of the claw 16a and is oriented perpendicular to the direction of actuation 14a. The claw 16a is disposed with its claw base 33a on the main body 49a of the second form-locking element 13a. The claw 16a has opposite the coupling flank 23a a flank 29a which encloses an acute angle 31a with the plane 25a defined by the top surface 18a of the claw 16a.

The coupling flank 28a of the claw 16a of the second form-locking element 13a is directed in the opposite direction to the direction of rotation 47a. The surface normals of the coupling flank 23a of the claw 16a point in the opposite direction to the direction of rotation 47a. The flank 29a of the claw 16a of the second form-locking element 13a opposite the coupling flank 23a is directed in the direction of rotation 47a. The surface normals of the flank 29a of the claw 16a opposite the coupling flank 23a point in the direction of rotation 47a. In the closed state of the form-locking unit 11a the second form-locking element 13a prevents a rotation of the first form-locking element 12a in the direction of rotation 47a. In the closed state of the coupling device S2a the claws 15a, 16a transmit a load torque in the traction mode of the motor vehicle.

The claws 15a of the first form-locking element 12a have a spacing from one another in the circumferential direction 21a which is greater than an extent of the claws 16a of the second form-locking element 13a directed in the circumferential direction 21a. In an analogous manner the claws 16a of the second form-locking element 13a have a spacing from one another in the circumferential direction 21a which is greater than an extent of the claws 15a of the first form-locking element 12a directed in the circumferential direction 21a. Thus the claw toothings have a backlash play, so that the risk of ratcheting after release of the tooth-on-tooth position is reduced. In the closed state of the form-locking unit 11a the flank 28a of the claw 15a of the first form-locking element 12a opposite the coupling flank 22a and the flank 29a of the claw 16a of the second form-locking element 13a opposite the coupling flank 23a are spaced from one another in the circumferential direction 21a. A rotation in the backlash play of the form-locking elements 12a, 13a in an overrun mode of the motor vehicle is prevented by the closed friction-locking unit 10a. In the closed state of the friction-locking unit 10a the first friction-locking elements 36a prevent a rotation of the first form-locking element 12a in a direction of rotation opposed to the direction of rotation 47a. In the closed state of the coupling device S2a the friction-locking elements 36a, 37a transmit the load torque in the traction mode of the motor vehicle.

The claws 15a, 16a are configured to be complementary to one another or are disposed so that they form a cuboid when there is complete contact between the top surface 17a of the first form-locking element 12a and the top surface 18a of the second form-locking element 13a. In a section along the direction of actuation 14a through the claws 15a, 16a, these claws in each case have a geometric shape which can be composed of a single triangle and a single rectangle. In the case of complete contact of the top surfaces 17a, 18a both the coupling flank 22a of the claw 15a of the first form-locking element 12a and the flank 29a of the claw 16a of the second form-locking element 13a and also the flank 28a of the claw 15a of the first form-locking element 12a and the coupling flank 23a of the claw 16a of the second form-locking element 13a lie in a line.

In the closed state of the form-locking unit 11a the plane 24a which is defined by the top surface 17a of the claw 15a of the first form-locking element 12a and the plane 25a which is defined by the top surface 18a of the claw 15a of the second form-locking element 13a are disposed so as to be offset parallel to one another. In the closed state of the form-locking unit 11a the plane 24a which is defined by the top surface 17a of the claw 15a of the first form-locking element 12a intersects the coupling flank 23a and the flank 29a of the claw 16a of the second form-locking element 13a. In the closed state the plane 25a which is defined by the top surface 18a of the claw 16a of the second form-locking element 13a intersects the coupling flank 22a and the flank 28a of the claw 15a of the first form-locking element 12a. In the closed state of the form-locking unit 11a there is no reciprocal contact between the claws 15a of the first form-locking element 12a and the main body 49a of the second form-locking element 13a or between the claws 16a of the second form-locking element 12a and the main body 48a of the first form-locking element 12a. This ensures that an axial force does not act permanently on the form-locking elements 12a, 13a. The axial force is supported by means of a piston stop.

The top surfaces 17a, 18a are provided to contact one another in a planar manner and to slide on one another in the tooth-on-tooth position. Due to an actuating force which acts in the direction of actuation 14a and presses the top surfaces 17a, 18a against one another, a circumferential force acting in the circumferential direction 21a is produced by the chamfered top surfaces 17a, 18a. Due to the circumferential force the top surfaces 17a, 18a slide on one another. Due to the circumferential force an overpressure is applied to the friction-locking unit 10a, so that the first friction-locking elements 36a, and thus the first form-locking element 12a permanently connected non-rotatably to the first friction-locking elements 36a, rotate relative to the second form-locking element 13a. As a result the tooth-on-tooth position is released, so that the claws 15a and the claws 16a interengage by form-locking. The top surfaces 17a, 18a are configured or disposed with respect to one another in such a way that a circumferential force is produced which acts in the direction of rotation 47a on the first form-locking element 12a, so that the first form-locking element 12a rotates in the direction of rotation 47a when an overpressure is applied to the friction-locking unit 10a.

For actuation of the friction-locking unit 10a and the form-locking unit 11a the second coupling device S2a has two actuating units 43a, 44a which are independent of one another. The friction-locking unit 10a and the form-locking unit 11a are actuated one after the other, wherein the friction-locking unit 10a engages before the form-locking unit 11a. The form-locking unit 11a is always closed when the friction-locking unit 10a is closed. The first actuating unit 43a actuates the friction-locking unit 10a. The first actuating unit 43a has an axially movable actuating element which, for non-rotatable connection of the coupling elements S21a, S22a of the second coupling device S2a, presses axially against the disc set of the friction-locking unit 10a of the combined gear shift unit S2a, so that discs of the disc set move axially relative to one another until they bear against one another and the coupling elements S21a, S22a are connected to one another by non-positive engagement.

The second actuating unit 44a actuates the friction-locking unit 11a. The second actuating unit 44a has an axially movable actuating element 46a which is fixedly connected to the second form-locking element 13a and is axially movably but non-rotatably connected to the fixed coupling element S22a and thus to the transmission housing 39a. For non-rotatable connection of the coupling elements S21a, S22a of the second coupling device S2a, the actuating element 46a of the second actuating unit 44a and, as a result, the second form-locking element 13a moves axially in the direction of the first form-locking element 12a, until the mutually corresponding claw toothings of the form-locking unit 11a of the second coupling device S2a interengage by form-locking and the coupling elements S21a, S22a are connected to one another by form-locking. The actuating units 43a, 44a are in each case hydraulic. They are disposed inside the transmission housing 39a. In principle, however, the actuating units 43a, 44a can also be electric or pneumatic. Furthermore, in principle it is conceivable that the second coupling device S2a has for actuation of the friction-locking unit 10a and the form-locking unit 11a a common actuating unit or two actuating units which are independent of one another. Furthermore it is in principle conceivable that additionally or alternatively at least one of the other coupling devices S1a, S3a, S4a, S5a, S6a has a friction-locking unit and a form-locking unit connected in parallel with the friction-locking unit in an analogous manner to the second coupling devices S2a.

In an operational state in which the second coupling device S2a is shifted from an open state into a closed state, by means of the first actuating unit 43a first of all the friction-locking unit 10a is closed and then with the friction-locking unit 10a closed the form-locking unit 11a is closed by means of the second actuating unit 44a. In a tooth-on-tooth position, and thus upon meeting of the top surfaces 17a of the claws 15a of the first form-locking element 12a and the top surfaces 18a of the claws 16a of the second form-locking element 13a, the top surfaces 17a, 18a which are oriented obliquely with respect to the direction of actuation 14a slide on one another, so that the circumferential force for application of overpressure to the friction-locking unit 10a and thus for rotation of the first form-locking element 12a is generated from the actuating force by which the second form-locking element 13a is moved axially in the direction of the first form-locking element 12a for closure of the form-locking unit 11a. In this case an actuating force of the closed friction-locking unit 10a, in this exemplary embodiment a hydraulic actuation pressure, is reduced. If the actuating force of the closed friction-locking unit is only so great that the applied load torque is transmitted, the actuating force does not have to be lowered in order to release a tooth-on-tooth position. The circumferential force of the claw toothing generates a force differential by which, with a constant actuating force, the disc is made to slip. At a specific circumferential force an overpressure is applied to the friction-locking unit 10a, so that the first form-locking element 12a, and thus the friction-locking unit 10a which is permanently connected non-rotatably to the first friction-locking elements 36a of the friction-locking unit 10a, rotates in the direction of rotation 47a. Due to the rotation of the first form-locking element 12a the tooth-on-tooth position is released and the form-locking elements 12a, 13a engage in one another by form-locking.

Figure 5:
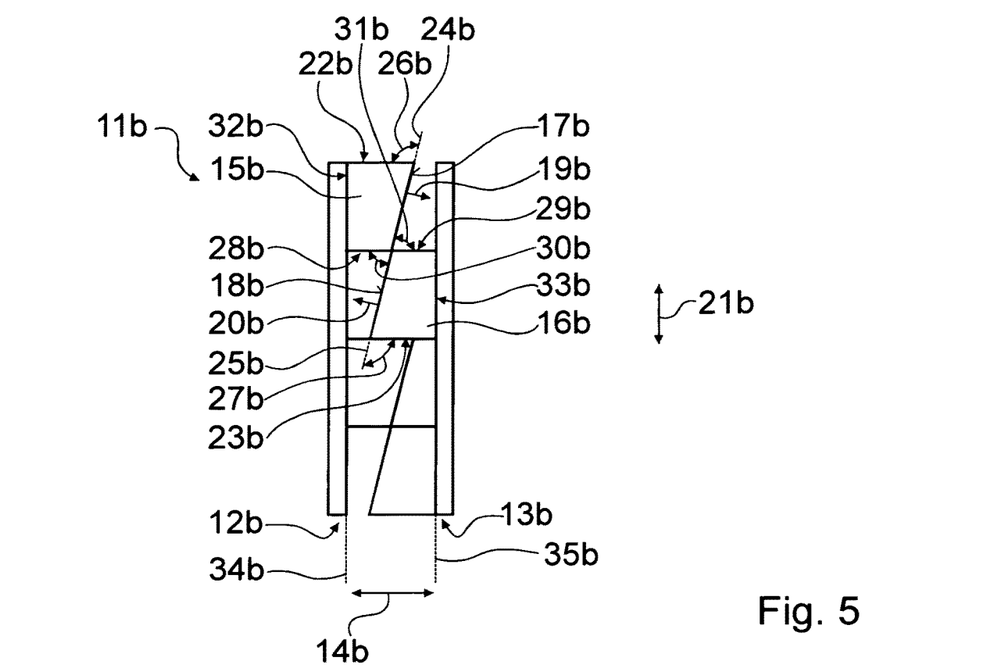
FIG. 5 shows an alternatively configured form-locking unit schematically in a closed state.
Figure 6:
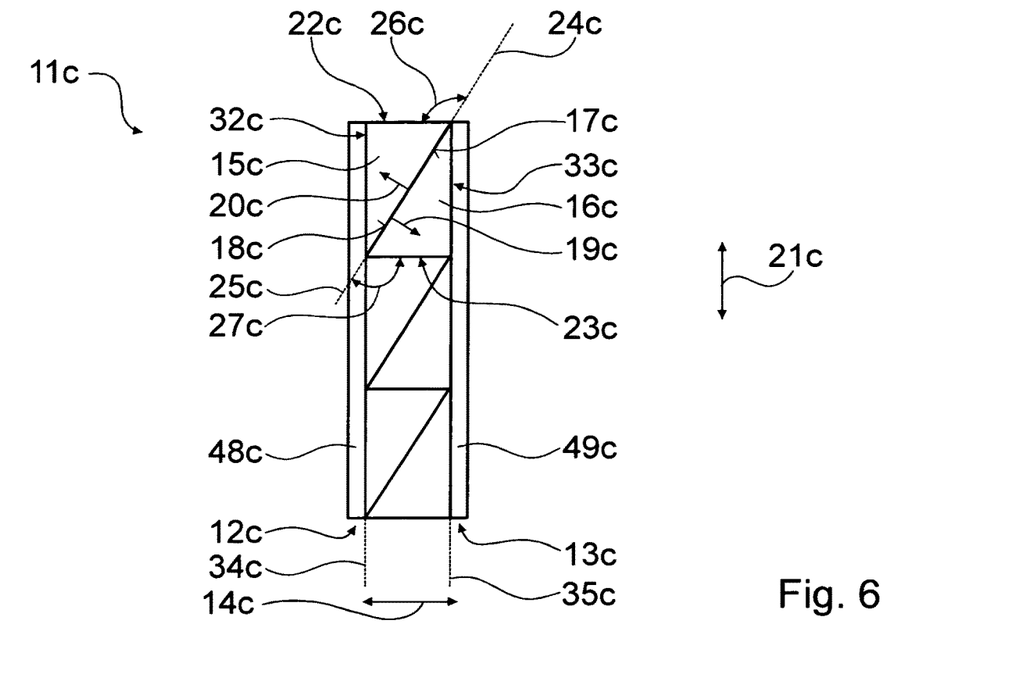
FIG. 6 shows schematically a third exemplary embodiment of a form-locking unit in a closed state.

FIGS. 5 to 6 further show two further exemplary embodiments of the invention are shown in FIGS. 5 to 6. The following descriptions are limited substantially to the differences between the exemplary embodiments, wherein, with regard to components with the same designations, in particular with regard to components with the same reference signs, reference may be made in principle to the drawings and/or the description of the other exemplary embodiments, in particular the exemplary embodiment shown in FIGS. 1 to 4. In order to distinguish the exemplary embodiments, the letter a in the reference signs of the exemplary embodiment in FIGS. 1 to 4 is replaced by the letter b in the reference signs of the exemplary embodiment in FIGS. 5 and 6.

FIG. 5 shows a second exemplary embodiment of a form-locking unit 11b, which is shifted into a closed state, of a coupling device for a motor vehicle. The coupling device is configured as a shifting device which is provided for shifting gears. It is used in a multi-stage transmission of the motor vehicle. The coupling device has, in addition to the form-locking unit 11b, a friction-locking unit (not shown) wherein the friction-locking unit and the form-locking unit 11b shifted in parallel with one another. The form-locking unit 11b has two form-locking elements 12b, 13b which can be connected to one another by form-locking, are disposed movably relative to one another along a direction of actuation 14b and each have a plurality of claws 15b, 16b. The first form-locking element 12b is permanently connected non-rotatably to the first friction-locking elements of the friction-locking unit. The claws 15b, 16b in each case have a planar top surface 17b, 18b which is oriented obliquely with respect to the direction of actuation 14b. The top surfaces 17b, 18b each have surface normals 19b, 20b which in each case have a directional component greater than zero directed in the circumferential direction 21b and a radially directed directional component equal to zero.

The claws 16b also in each case have a coupling flank 22b, 23b which in each case enclose an obtuse angle 26b, 27b with a plane 24b, 25b defined by the associated top surface 17b, 18b. In this case the coupling flanks 22b, 23b each enclose a right angle with a plane 34b, 35b which is disposed on the associated claw base 32b, 33b and is oriented perpendicular to the direction of actuation 14b. Furthermore, the claws 15b, 16b also in each case have opposite the coupling flank 22b, 29b a flank 28b, 29b which in each case enclose an acute angle 30b, 31b with the plane 24b, 25b defined by the associated top surface 17b, 18b.

In contrast to the previous exemplary embodiment the claws 15b, 16b form a sawtooth gap profile. The claws 15b, 16b are more highly chamfered by comparison with the previous exemplary embodiment. They are chamfered up to 45°. In the closed state of the form-locking unit 11b, and thus in a state in which the coupling flanks 22b of the claws 15b of the first form-locking element 12b and the coupling flanks 23b of the claws 16b of the second form-locking element 13b bear against one another so as to transmit torque, the flanks 28a, 29a are disposed at least substantially in alignment with one another. In the closed state of the form-locking unit 11b the flank 28b of the claw 15b of the first form-locking element 12b and the flank 29b of the claw 16b of the second form-locking element 13b are disposed at least substantially in a line. In the closed state of the form-locking unit 11b the plane 24b which is defined by the top surface 17b and the plane 25b which is defined by the top surface 18b lie on or in one another. In the closed state of the form-locking unit 11b the plane 24b which is defined by the top surface 17b of the claw 15b of the first form-locking element 12b, with the coupling flank 23 and the flank 29b of the claw 16b of the second form-locking element 13b, lacks a sectional line. In the closed state of the form-locking unit 11b the plane 25b which is defined by the top surface 18b of the claw 16b of the second form-locking element 13b, with the coupling flank 22b and the flank 28b of the claw 15b of the first form-locking element 12b, also lacks a sectional line.

The claws 15b, 16b are configured in such a way that, when a rotation of the form-locking elements 12b, 13b breaks the contact between the coupling flanks 22b, 23b, a contact between the flanks 28b, 29b is prevented. Due to such rotation of the form-locking elements 12b, 13b the top surfaces 17b, 18b lie on one another, without the flanks 28b, 29b opposite the coupling flanks 22b, 23b previously being in reciprocal contact.

The claws 15b of the first form-locking element 12b have a spacing from one another in the circumferential direction 21b which corresponds at least approximately to an extent of the claws 16b of the second form-locking element 13b directed in the circumferential direction 21b. In an analogous manner the claws 16b of the second form-locking element 13b have a spacing from one another in the circumferential direction 21b which corresponds at least approximately to an extent of the claws 15b of the first form-locking element 12b directed in the circumferential direction 21b. Thus the form-locking elements 12b, 13b lack a backlash play.

FIG. 6 shows a third exemplary embodiment of a form-locking unit 11c, which is shifted into a closed state, of a coupling device for a motor vehicle. The coupling device is configured as a shifting device which is provided for shifting gears. It is used in a multi-stage transmission of the motor vehicle. The coupling device has, in addition to the form-locking unit 11c, a friction-locking unit (not shown) wherein the friction-locking unit and the form-locking unit 11c are shifted in parallel with one another. The form-locking unit 11c has two form-locking elements 12c, 13c which can be connected to one another by form-locking, are disposed movably relative to one another along a direction of actuation 14c and each have a plurality of claws 15c, 16c. The first form-locking element 12c is permanently connected non-rotatably to the first friction-locking elements of the friction-locking unit. The claws 15c, 16c in each case have a planar top surface 17c, 18c which is oriented obliquely with respect to the direction of actuation 14c. The top surfaces 17c, 18c each have a surface normal 19c, 20c which in each case have a directional component greater than zero directed in the circumferential direction 21c and a radially directed directional component equal to zero.

The claws 15c, 16c also in each case have a coupling flank 22c, 23c which in each case enclose an obtuse angle 26c, 27c with a plane 24c, 25c defined by the associated top surface 17c, 18c. In this case the coupling flanks 22c, 23c each enclose a right angle with a plane 34c, 35c which is disposed on the associated claw base 32c, 33c and is oriented perpendicular to the direction of actuation 14c.

In contrast to the previous exemplary embodiment the top surfaces 17c, 18c in each case extend as far as the respective claw base 32c, 33c. The top surface 17c extends from the coupling flank 22c of the claw 15c as far as the claw base 32c of the claw 15c. In an analogous manner the top surface 18c extends from the coupling flank 23c of the claw 16c as far as the claw base 33c of the claw 16c. The claws 15c, 16c form a sawtooth profile. In contrast to the previous exemplary embodiment the top surfaces 17c, 18c in each case extend as far as the next claw base 15c, 16c, so that there is no axial gap between a main body 48c, 49c and the claws 15c, 16c. In the closed state of the form-locking unit 11c, and thus in a state in which the coupling flanks 22c of the claws 15c of the first form-locking element 12c and the coupling flanks 23c of the claws 16c of the second form-locking element 13c bear against one another so as to transmit torque, the top surfaces 17c, 18c are in complete contact with one another. In the closed state of the form-locking unit 11c the plane 24c which is defined by the top surface 17c and the plane 25c which is defined by the top surface 18c lie on or in one another. The claws 15c, 16c are configured in such a way that the top surfaces 17c, 18c contact one another during tracking and in the closed state. In a section along the direction of actuation 14c the claws 15c, 16c in each case have a geometric shape which, in contrast to the previous embodiments, can be composed of a single triangle. The claws 15c, 16c are in each case triangular in the section along the direction of actuation 14c.

In a further contrast to the previous embodiments, in the closed state the claws 15c of the first form-locking element 12c contact the main body 49c of the second form-locking element 13c and the claws 16c of the second form-locking element 13c contact the main body 48c of the first form-locking element 12c.

The invention claimed is:

1. A coupling device for a motor vehicle, comprising:
   a friction-locking unit;
   a form-locking unit, wherein the form-locking unit is connected in parallel with the friction-locking unit and has a first form-locking element and a second form-locking element which are connectable to one another by form-locking, are movable along a direction of actuation relative to one another, and wherein the first form-locking element and the second form-locking element each have a respective claw; and
   a first actuating unit and a second actuating unit which are independent of one another, wherein the friction-locking unit and the form-locking unit are each actuatable by one of the first actuating unit and the second actuating unit;
   wherein each of the respective claws has a respective top surface which is oriented obliquely with respect to the direction of actuation and which is oriented transversely with respect to the direction of actuation;
   wherein each of the respective claws has a respective coupling flank which encloses an angle greater than 90° with a plane defined by the respective top surface and which is oriented parallel to the direction of actuation;
   and wherein each of the respective claws has a respective flank opposite the respective coupling flank which encloses an angle less than 90° with the plane defined by the respective top surface and which is oriented parallel to the direction of actuation.

2. The coupling device according to claim 1, wherein the respective top surfaces are planar.

3. The coupling device according to claim 1, wherein the respective top surfaces each have a surface normal with a directional component greater than zero directed in a circumferential direction.

4. The coupling device according to claim 1, wherein the respective top surfaces each have a surface normal with a radially directed directional component equal to zero.

5. The coupling device according to claim 1, wherein the respective coupling flanks each enclose a right angle with a respective plane which is disposed on a respective claw base and which is oriented perpendicular to the direction of actuation.

6. The coupling device according to claim 5, wherein the respective top surfaces extend as far as the respective claw base.

7. The coupling device according to claim 1, wherein the respective claws are disposed on a respective end face of the first form-locking element and the second form-locking element.

8. The coupling device according to claim 1, wherein the friction-locking unit has at least one friction-locking element which is permanently connected non-rotatably to one of the first and second form-locking elements.

9. The coupling device according to claim 1, wherein the first actuating unit actuates the friction-locking unit and the second actuating unit actuates the form-locking unit.

10. The coupling device according to claim 9, wherein the first actuating unit has an axially movable actuating element which, for non-rotatable connection of a first coupling element and a second fixed coupling element of the coupling device, presses axially against a disc set of the friction-locking unit such that discs of the disc set move axially relative to one another until they bear against one another and the first coupling element and the second fixed coupling element are connected to one another by non-positive engagement.

11. The coupling device according to claim 10, wherein the second actuating unit has an axially movable actuating element which is fixedly connected to the second form-locking element and is axially movably but non-rotatably connected to the second fixed coupling element and to a transmission housing, wherein the actuating element of the second actuating unit moves axially in a direction of the first form-locking element until the respective claws of the first form-locking element and the second form-locking element interengage by form-locking and the first coupling element and the second fixed coupling element are connected to one another by form-locking.

* * * * *